Figure 1:
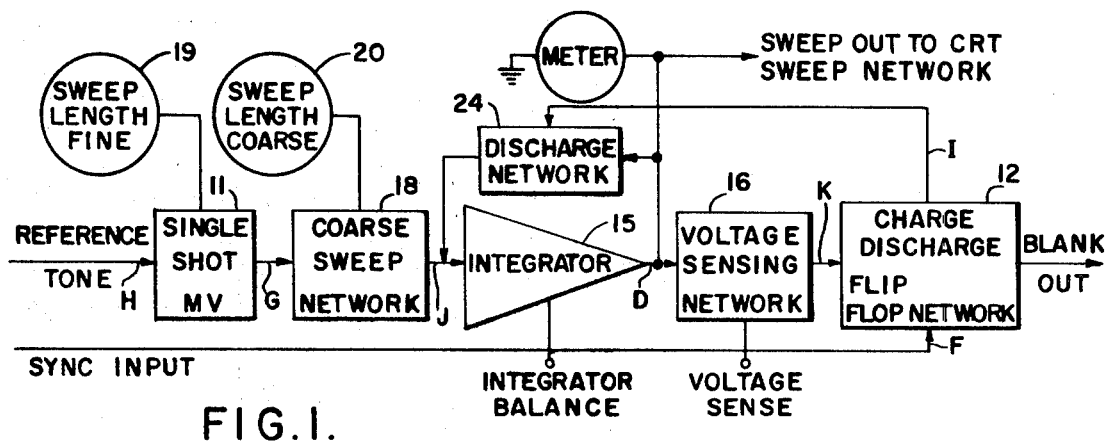

United States Patent

[11] 3,579,124

| [72] | Inventor | John Henry O'Hara |
| | | Bowie, Md. |
| [21] | Appl. No. | 823,911 |
| [22] | Filed | May 12, 1969 |
| [45] | Patented | May 18, 1971 |
| [73] | Assignee | The United States of America as represented by the Secretary of the Army |

[54] COMPENSATED SWEEP GENERATOR
8 Claims, 6 Drawing Figs.

[52] U.S. Cl.................................................. 328/181,
307/227, 307/228, 307/229, 328/127, 328/182, 328/184, 328/186
[51] Int. Cl...................................................... H03k 4/10, H03k 4/86
[50] Field of Search........................................... 307/227-
—228, 229; 328/127, 181—186

[56] References Cited
UNITED STATES PATENTS
2,581,199  1/1952  Moe.............................  328/182

| 2,645,715 | 7/1953 | Weller, Jr. et al........... | 328/182X |
| 2,854,575 | 9/1958 | Richardson .................. | 328/181 |
| 3,373,377 | 3/1968 | Townsend ..................... | 328/184X |
| 3,382,460 | 5/1968 | Blitz et al..................... | 328/184X |
| 3,412,336 | 11/1968 | Auyang ........................ | 328/127X |
| 3,439,282 | 4/1969 | Moriyasu...................... | 307/228X |

*Primary Examiner*—Stanley D. Miller, Jr.
*Attorney*—John R. Utermohle

ABSTRACT: An apparatus for generating a frequency-compensated sweep. A signal containing wow and flutter deviations is applied to the input of the generator, wherein these deviations are compensated for by increasing or decreasing the instantaneous value of the sweep voltage. An integrator portion of the generator generates the compensated sweep. The output of the integrator is a stairstep voltage, the rate of change of voltage varying as the input frequency varies with wow and flutter. The generator compensates for instantaneous variations in the time base due to wow and flutter by generating a time base that is a function of the wow and flutter. Either the number, amplitude, or width of the input pulses may be changed to vary the time base.

Patented May 18, 1971 3,579,124

4 Sheets-Sheet 1

INVENTOR
JOHN H. O'HARA
BY
ATTORNEY

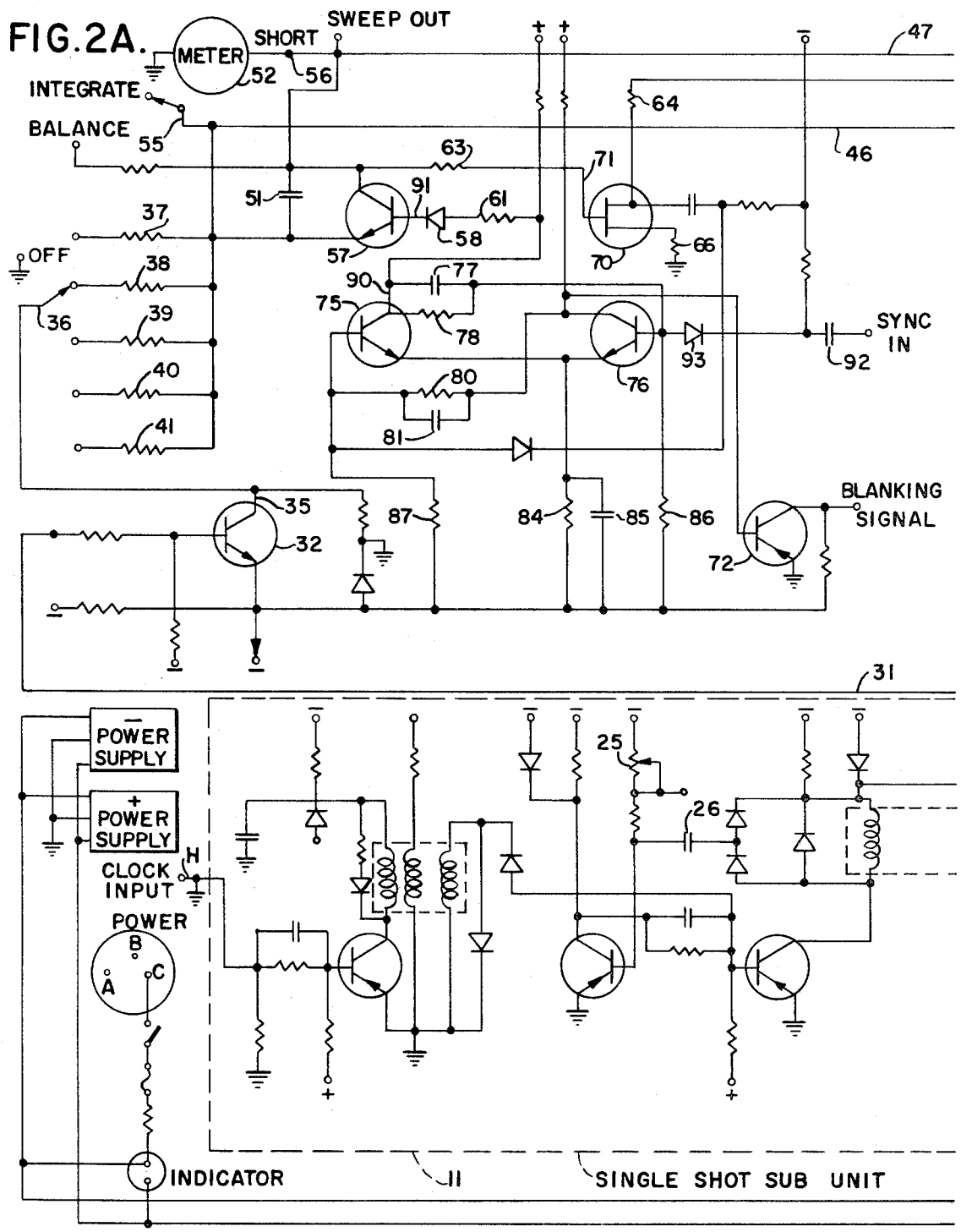

INVENTOR
JOHN H. O'HARA

INVENTOR
JOHN H. O'HARA

ATTORNEY

COMPENSATED SWEEP GENERATOR

BACKGROUND OF THE INVENTION

1. Field of the Invention

The present invention relates to a signal generator, and more particularly to a compensated sweep generator.

2. Prior Art

Prior art communication systems which have signal distortion present therein are concerned with either measuring the distortion present or eliminating it in some standard fashion. When the signal distortion is present in the form of wow and flutter, various schemes have been utilized to eliminate these frequency deviations, such as by deriving an error signal to control the speed of the capstan drive where a tape recorder, whether it be audio or video, is utilized to provide the information signal to the system; or where an error signal is derived, which is subsequently combined with a modulated information signal to eliminate the wow and flutter present in the information signal.

In prior art systems of the type used to control television signal raster generation, error signals are provided to deflection integrators to cause deflection control; however, these integrators vary the time base of the signal at a constant rate, in a standard fashion, such as by varying the amplitude of the signal input to the integrator, rather than as an instantaneous function of the wow and flutter present in the signal.

In photoanalog systems, where a visual display of an information signal, such as a pulse-position-modulation signal utilized in telemetry, the necessary information may be contained in relatively short time pulse intervals, and the presence of distortion in this visual display, due to wow and flutter, could result in appreciable error in analyzing the information content. Prior art sweep generators for systems of this nature do not provide compensation for the wow and flutter present in the information signal, but rather attempt to eliminate the distortions at the input to the sweep generator. Prior art systems of this nature may be more complex than the present invention. The present invention provides a relatively simple means for instantaneously compensating for any frequency deviations present in an information signal so that, when a visual display of the information signal is utilized, the signal distortions do not appear in the display.

SUMMARY OF THE INVENTION

An object of the present invention is to provide a new and improved compensated sweep generator which overcomes the disadvantages of the prior art.

Another object of the present invention is to provide a new and improved compensated sweep generator which compensates for any instantaneous variances present in the input signal.

Still another object of the present invention is to provide a new and improved compensated sweep generator which compensates for any instantaneous variances in the input signal by generating a time base as a function of the distortion present in the signal.

With these and other objects in view, an apparatus for generating a frequency compensated sweep may include means for receiving a signal having instantaneous frequency variance; means for generating a time base for a sweep signal output, the time base being an instantaneous function of the instantaneous frequency variance of the received signal; and means for varying the characteristics of the sweep and controlling the generation of the sweep, the sweep signal output being compensated for any instantaneous variances in the received frequency variant signal.

Figure 3:
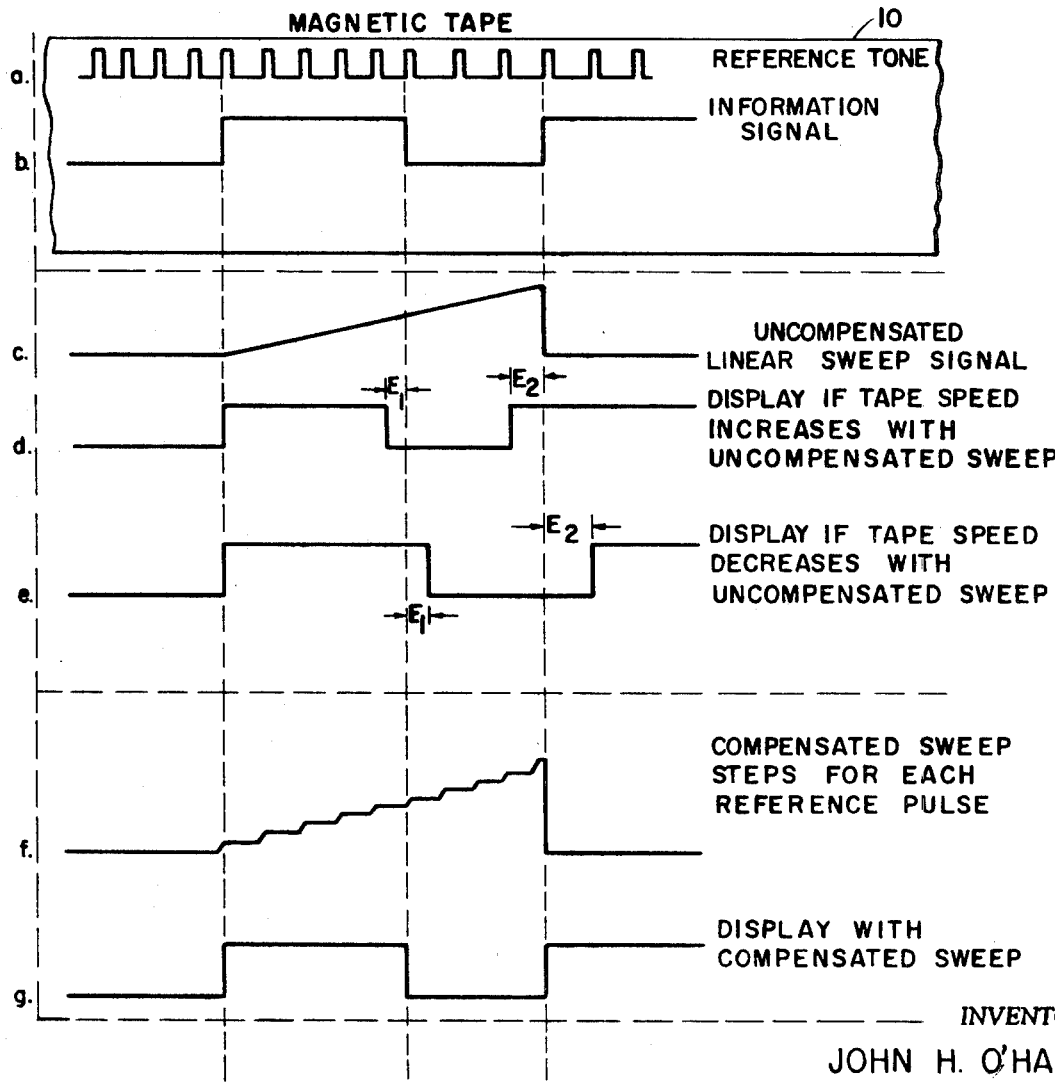
Figure 2B:
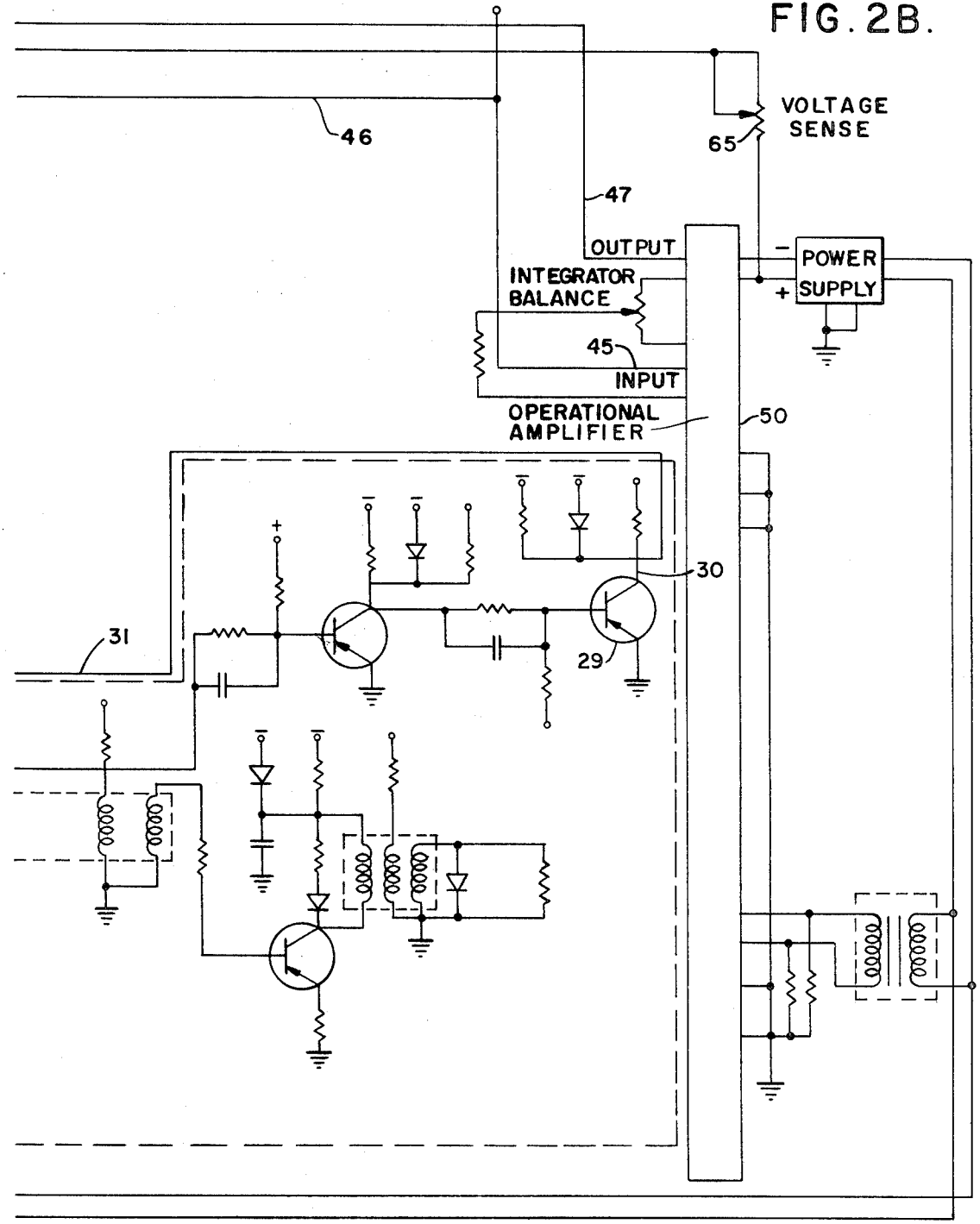
Figure 4:
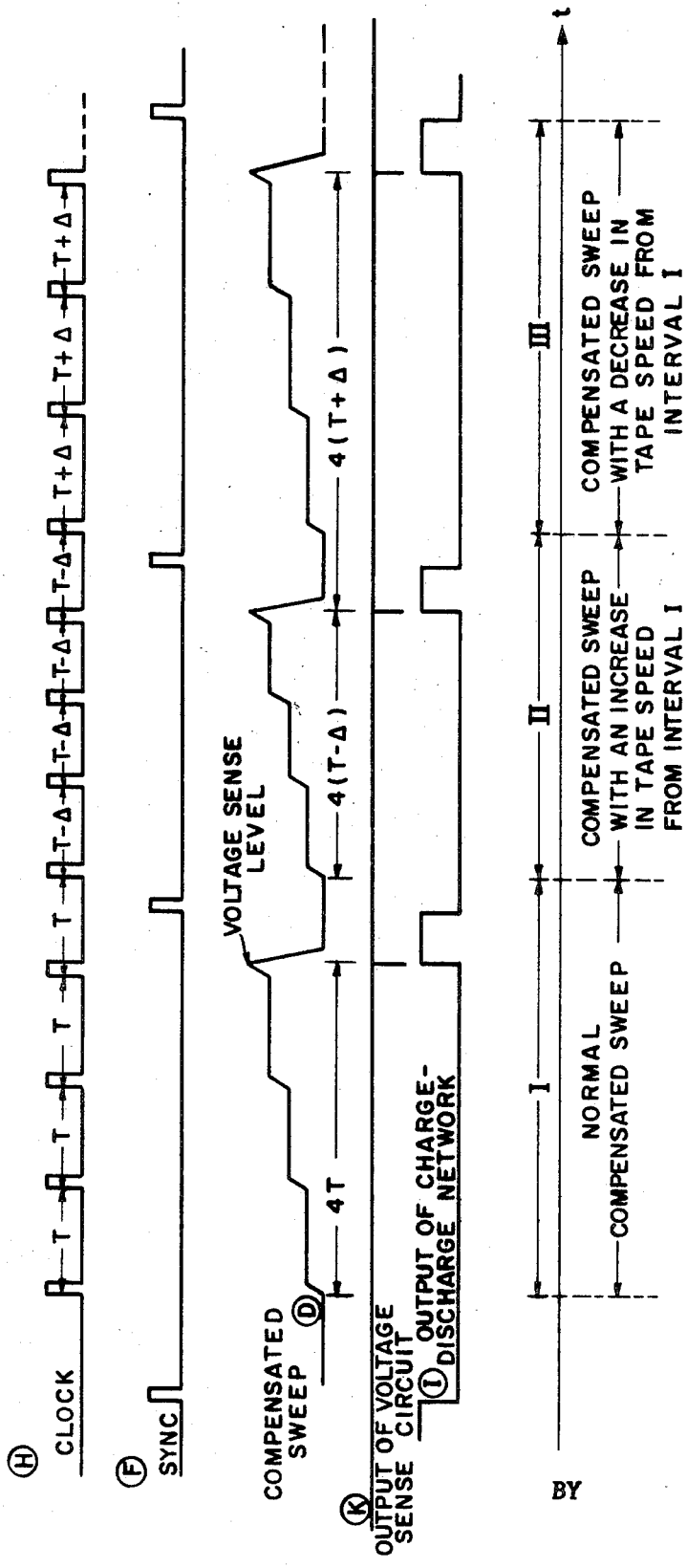
Figure 5:
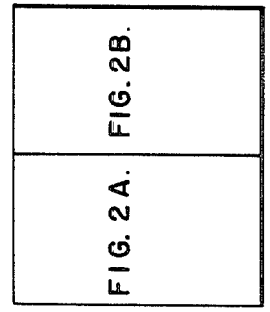

Other objects and many of the attendant advantages of this invention will be readily appreciated as the invention becomes better understood by reference to the description below, when taken in conjunction with the following drawings, wherein:

FIG. 1 is a block diagram of a preferred embodiment of the present invention;

FIGS. 2A and 2B, when assembled as shown in FIG. 5, are a schematic diagram of the preferred embodiment of the present invention shown in FIG. 1;

FIG. 3 is a graphic waveform representation of the operation of the preferred embodiment of the present invention, and FIG. 4 is a graph of the waveforms present in the preferred embodiment of the present invention.

Generally describing the operation of the system of the present invention, a recorded reference tone, recorded on the same tape as one containing information to be visually displayed, is frequency modulated at a rate proportional to the wow and flutter of the recording and playback tape units, the reference tone being a periodic waveform. This reference tone is fed constantly into the compensated sweep generator of the present invention, where it is integrated into a sawtooth waveform. This sawtooth waveform is fed to the sweep circuit of the visual display device, such as a cathode ray display unit. The start of the sawtooth wave is determined by a trigger pulse, derived in any standard fashion, that is fed into the compensated sweep generator. The sweep length is variable and controllable in the sweep generator of the present invention. The amplitude of the sawtooth waveform can also be varied. The compensated sweep generator of the present invention may also generate a blanking pulse, if desired, that can be utilized to blank the visual display unit when the sawtooth is not sweeping the tube of the unit. This may be a DC level that changes state for the duration of the sawtooth sweep.

Referring now to FIG. 1, the operation of the system is as follows: the incoming pulse train, frequency modulated at a rate proportional to the wow and flutter of the recording and playback units, is fed into a single shot 11 at point H. The output of the single shot 11, taken at point G, is a series of pulses identical in every way for any given setting of controls. The single shot 11 output is fed to a coarse sweep network 18, where the power is attenuated by a given fixed amount, dependent on the characteristics of the system. The coarse sweep network 18 output, taken at point J, is a pulse train whose power for a given interval of time is a function of the input pulse train and the sweep length fine control 19 and coarse controls 20.

The coarse sweep network 18 output is fed into an integrator 15, whose output, taken at point D, is a sawtooth waveform. The sawtooth output of the integrator 15 is of the type that builds up gradually, then abruptly returns to its initial voltage level to again rebuild. The abrupt return of the sawtooth waveform is accomplished by means of the discharge network 24, which is connected directly across the integrator 15; the discharge time of the sweep generator being independent of the time base chosen. The input pulses to the compensated sweep generator integrator 15 do not have to be switched out on the discharge cycle unless desired. The voltage sensing network 16, in conjunction with a charge-discharge flip-flop network 12, controls the discharge network 24 in such a manner that at a predetermined time, the discharge network 24 will provide a 180° feedback across the integrator 15.

A graphic waveform representation of the operation of the system is shown in FIG. 3, wherein a square wave, shown in FIG. 3b, is utilized, for illustrative purposes as the information signal. Taking a one complete cycle interval, an uncompensated linear sweep signal, shown in FIG. 3c, would be a ramp function. The visual display of the uncompensated sweep signal would result in a distorted signal, where wow and flutter were present in the information signal. This visual display would be of the type shown in FIGS. 3d and 3e, having cumulatively decreasing pulse width, if the tape speed increased, or having cumulatively increasing pulse width, if the tape speed decreased, the error in the display being cumulative such that $E_2$ is greater than $E_1$. The compensated sweep signal of the present invention, shown in FIG. 3f, wherein wow and flutter present in the input signal, in this case the reference tone (FIG. 3a) which is frequency modulated at a rate proportional to the wow and flutter of the recording and playback units, is compensated for, is a stairstep function, one step increment for each reference pulse, as opposed to the linear ramp function of the uncompensated sweep signal. The resultant visual display, shown in FIG. 3g, is the undistorted information signal regardless of tape speed.

A graph of the waveforms present at selected points, the selected points being shown in FIG. 1, throughout the circuit of the preferred embodiment of the present invention is shown in FIG. 4. For purposes of illustration, a clock pulse train input, utilized as the reference tone, and sync pulse train input are utilized. The clock input appears at the input to the single shot 11, which is designated point H. The sync input is fed to the charge-discharge flip-flop 12 at point F. The compensated sweep output, which is a stairstep, appears at point D, which is the output of the integrator 15. The voltage is stepped until a desired voltage sense level is reached, at which time the integrator 15 abruptly discharges. The output of the voltage sensing network 16 is a spike function, which appears at point K. The output of the charge-discharge flip-flop network 12 is a pulse train, which appears at point I, the pulse commencing with the receipt of the voltage sense spike pulse and terminating with the commencing of the sync input pulse. Three conditions are illustrated in FIG. 4; a normal compensated sweep with no instantaneous tape speed variations present, designated interval I; a compensated sweep when there is an increase in tape speed from the initial interval, designated interval II; and a compensated sweep when there is a decrease in tape speed from the initial interval, designated interval III.

Referring now to FIGS. 2A and 2B, assembled as shown in FIG. 5, which is a detailed schematic of the circuit of the preferred embodiment of the present invention, the single shot subnetwork 11 has as its primary function changing the incoming reference tone, which is, as previously mentioned, for illustrative purposes, a clock input, inserted at point H, into pulses, shaped identical in every way, for any given setting of the controls. The reference tone does not have to be a pulse train. It can be a sine wave, or any periodic signal with sufficient amplitude to fire the single shot 11. Hence for measurement and check out of the compensated sweep generator of the present invention, a very stable oscillator could be utilized. The single shot 11 output will then be a series of pulses.

The pulse width can be varied by changing the value of a sweep length fine control impedance 25. This controls the charge time of a capacitor 26 with which it is operatively associated, thereby controlling the pulse duration at the collector of a single shot output transistor 29 (FIG. 2B), which is the output of the single shot 11. In this network, the output power of the single shot 11 for any given period of time is a function of the input frequency, as well as the setting of the sweep length fine control 19.

The output of the single shot 11, taken from a collector 30 of the single shot output transistor 29 is fed directly to the coarse sweep network 18 by a conductor 31. The coarse sweep network 18 consists of a level changer, a switch and a resistor bank. The level changer, an inverter transistor 32, is necessary to minimize errors caused by the collector 30 of the single shot output transistor 29 not returning a true ground level. If a true ground level could be achieved, then it would be possible to eliminate this level changer. The output of the level changer 32, at the collector 35 of the transistor 32, is fed through a switch 36 to a resistor bank which includes resistors 37 through 41, inclusive. The resistor bank attenuates the power coming into the coarse sweep control network 18 by a fixed amount determined by the position of the switch 36. The output of the coarse sweep network 18 is a pulse train, whose power per given interval of time is a function of the clock input frequency and the sweep length fine control 19 and coarse control 20. The sweep length coarse control 20 may be a wafer switch calibrated in sweep times of desired interval, such as 0.5 ms., 1 ms., 2 ms., 4 ms., and 8 ms. Any sweep length within the specified ranges can be obtained by varying the sweep length fine control 19. The switch 36 may be provided with a slight overlap on each switch setting so that all desired possible sweep times could be obtained.

The integrator 15 is the device that actually generates the sweep. The output of the coarse sweep network 18 is fed directly to the summing junction 45 of the integrator 15 via its associated path 46. The output 47 of the integrator 15 is a voltage directly proportional to the power fed into the summing junction 45 over any given period of time. Since the input is a series of pulses, in the embodiment being illustrated, the output 47 will be a voltage that increases by a small increment for each pulse input. The output 47 is actually a stairstep voltage, and may consist of a nominal one million steps per second, depending on the parameters of the various circuit elements. As the input frequency varies, the number of pulses varies and, hence, the rate of change of voltage varies. Under a typical operating condition, for example, a sweep length equal to 2 milliseconds, a sweep amplitude equal to 10 volts, and an input frequency equal to 1 megacycle, the sawtooth would consist of 2,000 increments, each having an amplitude of 5 millivolts.

The integration network 15 consists of a high gain, chopper-stabilized operational amplifier 50, using a capacitor 51 as the feedback element. Any reliable high gain chopper-stabilized operational amplifier may be utilized, such as the Philbrick Model sp656 operational amplifier, and may be connected to the circuit of the present invention in the manner shown in the Philbrick Technical Description for the GAP/R Model sp656, published May 18, 1964, in a FIG. entitled "External Surface Connections," and such a configuration is illustrated in FIG. 2 of the present invention.

The circuit of the chopper-stabilized operational amplifier 50 of the present invention contains a warning indicator that tells the operator that the operational amplifier 50 is saturating. A meter 52 is utilized in the present invention for this purpose; however, any other appropriate warning device, such as a light or a buzzer might be utilized. When an indication of saturation is given, the switch 55 is placed in the short position 56 in order to unsaturate the operational amplifier 50. This switch 55 placement may be accomplished manually or automatically.

The purpose for the warning indication mechanism 52 in the present invention is due to the fact that, although chopper-stabilized amplifiers are quite fast, being just as fast as nonstabilized amplifiers, if allowed to run into limit and saturate, large internal capacitors may require a long recovery time for charge to be restored to proper levels. In high gain applications such as an integrator, where saturation is likely, a nonlinear feedback network that switches to low impedance as the amplifier output starts to exceed rated voltage is normally desirable. The meter switch combination 52, 55 of the present invention is one method of accomplishing prevention of saturation of the chopper-stabilized operational amplifier 50 of the present invention. Another method, as suggested in the Philbrick Technical Description for the GAP/R model sp656, is to place a pair of Zener diodes in series. Several other acceptable methods may also be utilized.

The function of the discharge network 24 is to return the integrator 15 output voltage back to reference potential at the end of the sweep time. The discharge network 24 consists of a transistor 57, a diode 58 and an impedance resistor 61. At the end of the sweep, a positive voltage level is generated by the charge-discharge flip-flop network 12. This positive level turns on the discharge network transistor 57. Since this transistor 57 is tied directly across the input and output of the operational amplifier 50, it acts as a short circuit. The operational amplifier 50 now has 180° feedback and the output is driven to reference potential.

The input to the operational amplifier 50 is always present, so in order to start a new sweep, the discharge transistor 57 has to be turned off by the charge-discharge flip-flop network 12. The function of the discharge diode 58 is to minimize leakage current through the emitter junction of the discharge transistor 57 when it is turned off. A high impedance for the discharge transistor 57 in its off state insures good linearity of the output sawtooth.

The function of the voltage sensing network 16 is to change the state of the charge-discharge flip-flop network 12 at the end of a sweep. This network 16 consists of a plurality of resistors 63, 64, 65 and 66. A unijunction transistor 70 has its emitter 71 tied through a voltage sensing resistor 63 directly to the sawtooth being generated. As long as the firing potential of the unijunction transistor 70 is not reached, the input impedance is very large. When the unijunction transistor 70 reaches its firing potential, the input impedance is low and the voltage output to the voltage sensing resistor 65 goes negative very sharply. This negative pulse is used to change the state of the charge-discharge flip-flop network 12. The voltage level at which the unijunction transistor 70 fires, hence, the amplitude of the sawtooth, can be determined by adjusting the voltage sense potentiometer 65, thus varying the firing level.

The purpose of the charge-discharge flip-flop network 12 is two-fold. It turns discharge transistor 57, across the operational amplifier 50, on and off, starting and stopping the sweep. It also generates a logic level that goes positive when a sweep is being generated and negative otherwise. This output is inverted by an output transistor 72 and fed out as the blanking signal to blank the cathode ray tube, when a cathode ray visual display device is being utilized, when no sweep is being generated.

The flip-flop network 12 consists of two transistors 75 and 76 and their associated resistors and capacitors 77, 78, 80, 81, 84, 85, 86 and 87. The flip-flop network 12 uses a negative, common emitter bias which enables the collector 90 of one flip-flop transistor 75 to swing about ground. This collector 90 is tied to the base 91 of the discharge transistor 57 through the discharge impedance 61 and discharge diode 58. Every time the flip-flop goes through a set-reset state a sawtooth is generated.

The flip-flop is set by the sync input signals inserted through a capacitor 92 and a diode 93. When a sync pulse is received, one flip-flop transistor 76 is turned off, the other flip-flop transistor 75 is turned on, the discharge transistor 57 is turned off and the input to the unijunction transistor 70 starts going positive. When the unijunction transistor 70 reaches its firing potential, its collector voltage goes negative and turns off the flip-flop transistor 75 that is on. The collector 90 on this flip-flop transistor 75 goes positive and turns on the discharge transistor 57 which ends this sweep. The network then remains in this state until another sync pulse is received. It is apparent that one sawtooth is produced in this network for each sync input received.

Utilizing the compensated sweep generator of the present invention, a frequency compensated sweep for use in photoanalog systems wherein a recorded reference tone, recorded on the same tape to be displayed, containing the wow and flutter deviations to be compensated for, may be displayed with the wow and flutter present in the information signal compensated for, so as to provide a distortion-free visual display for analysis.

It is to be understood that the above-described embodiment of the invention is merely illustrative of the principles thereof and that numerous modifications and embodiments of the invention may be derived within the spirit and scope thereof, such as utilizing another type of integration means to provide the sawtooth output.

I claim:

1. A compensated sweep generator comprising:

means for receiving a signal having instantaneous frequency variance, said receiving means including a single-shot multivibrator, the output power of the multivibrator for any given period of time being a function of the instantaneous frequency of the received signal;

means for generating a time base for a sweep signal output, the time base being a function of the instantaneous frequency variance of the received signal;

means for varying the characteristics of the sweep, including means for varying the sweep length, said sweep length varying means including means for minimizing any errors due to the single-shot multivibrator not returning to a desired reference potential, and means for controlling the generation of the sweep, the sweep signal output being compensated for any instantaneous variances in the received frequency variant signal; and means for attenuating the power received by the sweep length varying means from the receiving means a predetermined amount, a single-shot multivibrator being operatively connected to the sweep length varying means.

2. A compensated sweep generator comprising:

means for receiving a signal having instantaneous frequency variance, said receiving means including a means for converting the instantaneously frequency variant signal into a series of identically shaped pulses, said converting means including a single shot multivibrator, the output power of the multivibrator for any given period of time being a function of the instantaneous frequency of the received signal and the converted signal width;

means for generating a time base for a sweep signal output, the time base being a function of the instantaneous frequency variance of the received signal, said time base generation means including an integrator, the output of said time base generation means being a stairstep voltage, the rate of change of the voltage varying as the input frequency varies with wow and flutter, the time base generation means compensating for the instantaneous frequency variance by varying the instantaneous value of the sweep voltage;

means for varying the characteristics of the sweep and controlling the generation of the sweep, the sweep signal output being compensated for any instantaneous variances in the received frequency variant signal, said sweep generation controlling means including a means for discharging the time base generation means when a desired step level is reached, said means for varying the characteristics of the sweep including a means for varying the sweep length and the sweep amplitude, said sweep length varying means including means for minimizing any errors due to the single-shot multivibrator not returning to a desired reference potential, said sweep generation controlling means further including a means for initiating and terminating the sweep at selected intervals, said sweep initiating and terminating means including a means having two states, a blanking signal being generated in at least one state, the one state being the state in which a sweep is not being generated, said sweep generation controlling means further including a means for changing the state of the sweep initiating and terminating means; and means for attenuating the power received by the sweep length varying means from the receiving means a predetermined amount, the single-shot multivibrator being operatively connected to the sweep length varying means.

3. A compensated sweep generator in accordance with claim 2 wherein:

the integrator includes a summing junction, the output of the sweep length varying means being fed directly to the integrator summing junction, the stairstep voltage output of the integrator being directly proportional to the power fed into the integrator summing junction over any given period of time, the integrator input being the series of identically shaped pulses, and the stairstep voltage output increasing incrementally for each input pulse.

4. A compensated sweep generator in accordance with claim 3 wherein:

the integrator further includes a high gain, chopper stabilized, operational amplifier, and a capacitive feedback means for the operational amplifier, the feedback means being connected between the operational amplifier input and output, the integrator being substantially linear over a desired operating range.

5. A compensated sweep generator in accordance with claim 4 wherein:

the time base generation discharge means includes a gating means, a positive voltage level being generated by the sweep initiating and terminating means at the end of the sweep, the positive level turning on the gating means, the gating means being connected directly between the input and output of the operational amplifier, the gating means providing a short circuit 180° feedback path to drive the integrator output voltage to reference potential when the gating means is in the on-state, the integrator output voltage thereby discharging to reference potential, the gating means preventing the initiation of a new sweep when the gating means is in the on-state, the discharge time being independent on the time base selected.

6. A compensated sweep generator in accordance with claim 5 wherein:

the initiating and terminating state changing means changes the state of the time base generation discharge means each time the state changing means generates a negative pulse, a negative pulse being generated each time the state changing means reaches a firing potential.

7. A compensated sweep generator in accordance with claim 6 wherein:

the sweep initiating and terminating means includes a flip-flop means, the flip-flop means being set by a sync pulse input signal, the gating means being turned off when the sync pulse is received; the state changing means going positive until the firing potential is reached; the state changing negative pulse being generated, turning on the gating means, ending the sweep; the state only being changed when another sync pulse is received by the sweep initiating and terminating means.

8. A compensated sweep generator in accordance with claim 7 wherein:

the sweep signal output is a sawtooth, one sawtooth being generated for each sync pulse input received by the sweep initiating and terminating means.